United States Patent
Iguma et al.

(10) Patent No.: US 11,458,830 B2
(45) Date of Patent: Oct. 4, 2022

(54) POWERTRAIN SYSTEM

(71) Applicant: TOYOTA JIDOSHA KABUSHIKI KAISHA, Toyota (JP)

(72) Inventors: Hiroki Iguma, Sunto-gun (JP); Tomohito Ono, Susono (JP); Hiroto Hashimoto, Ebina (JP); Daisuke Shirai, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 17/116,161

(22) Filed: Dec. 9, 2020

(65) Prior Publication Data
US 2021/0221215 A1 Jul. 22, 2021

(30) Foreign Application Priority Data

Jan. 21, 2020 (JP) .............................. JP2020-007688

(51) Int. Cl.
*B60K 6/46* (2007.10)
*B60W 20/13* (2016.01)
(Continued)

(52) U.S. Cl.
CPC ................ *B60K 6/46* (2013.01); *B60W 10/06* (2013.01); *B60W 10/08* (2013.01); *B60W 20/13* (2016.01)

(58) Field of Classification Search
CPC ......... B60K 6/46; B60W 10/06; B60W 10/08; B60W 20/13; Y02T 10/62
See application file for complete search history.

(56) References Cited

U.S. PATENT DOCUMENTS 6,158,405 A * 12/2000 Masberg ............... B60K 6/44
903/914
6,365,983 B1 * 4/2002 Masberg ............... F16F 15/18
322/14

(Continued)

FOREIGN PATENT DOCUMENTS

JP 2000064873 A 2/2000
JP 2009244251 A 10/2009
JP 2011-230707 A 11/2011

OTHER PUBLICATIONS

Eng Bin et al. "Simulation Model and Method for Active Torsional Vibration Control of an HEV" Applied Science DPI, Nov. 20, 2018 (Nov. 20, 2018), XP055672744, pp. 1, 4, 11, 12, & 14 (Year: 2018).*

*Primary Examiner* — Lindsay M Low
*Assistant Examiner* — Arnold Castro
(74) *Attorney, Agent, or Firm* — Oliff PLC

(57) ABSTRACT

A powertrain system includes an internal combustion engine, a motor generator and a control device. The motor generator includes a rotating shaft connected to a crankshaft of the internal combustion engine via a torsional damper. The powertrain system is configured such that the crankshaft and the above-described rotating shaft are not connected to a drive shaft of a vehicle at least at the time of engine start. The control device is configured to execute a cranking torque amplification control that controls the motor generator such that the MG torque output from the motor generator for cranking the internal combustion engine fluctuates in a resonant period of the torsional damper while making a fluctuation center of the MG torque higher than zero.

9 Claims, 16 Drawing Sheets

(51) Int. Cl.
*B60W 10/08* (2006.01)
*B60W 10/06* (2006.01)

(56) References Cited

U.S. PATENT DOCUMENTS

| | | | | |
|---|---|---|---|---|
| 6,382,163 | B1* | 5/2002 | Murray | B60K 6/485 |
| | | | | 123/192.1 |
| 2012/0160202 | A1* | 6/2012 | Vogt | F02N 11/0814 |
| | | | | 903/902 |
| 2012/0239237 | A1* | 9/2012 | Hashimoto | B60W 30/20 |
| | | | | 180/65.265 |
| 2013/0165240 | A1* | 6/2013 | Grimmer | F16D 3/14 |
| | | | | 464/68.2 |
| 2013/0328323 | A1* | 12/2013 | Reik | F02N 5/02 |
| | | | | 290/38 B |
| 2017/0247025 | A1* | 8/2017 | Velazquez Alcantar | |
| | | | | B60W 10/06 |
| 2022/0099061 | A1* | 3/2022 | Krause | F02N 11/0851 |

\* cited by examiner

POWERTRAIN SYSTEM

CROSS-REFERENCE TO RELATED APPLICATION

The present disclosure claims priority under 35 U.S.C. § 119 to Japanese Patent Application No. 2020-007688, filed on Jan. 21, 2020. The content of which is incorporated herein by reference in its entirety.

BACKGROUND

Technical Field

The present disclosure relates to a powertrain system and, more particularly, to a powertrain system configured such that a crankshaft of an internal combustion engine is connected to a rotating shaft of a motor generator via a torsional damper and the crankshaft and the rotating shaft of the motor generator are not connected to a drive shaft of a vehicle at least at the time of engine start.

Background Art

JP 2000-064873 A discloses a hybrid vehicle including an internal combustion engine and an electric motor as its drive sources. This hybrid vehicle includes a generator configured to generate electric power for driving the electric motor and start the internal combustion engine, and a starter motor configured to perform cranking of the internal combustion engine when it is difficult to crank the internal combustion engine by this generator.

Moreover, JP 2011-230707 A discloses a hybrid vehicle including an internal combustion engine and an electric motor as its drive sources, and also includes a torsional damper arranged between a crankshaft and the input shaft of a transaxle to reduce torsional vibration that occurs in the crankshaft. Furthermore, JP 2009-244251 discloses a failure determination device in a hybrid vehicle including an input shaft connected to a crankshaft via a torsional damper. This failure determination device monitors the torsion angle of the torsional damper and determines whether or not the torsional damper has failed based on the torsion angle.

SUMMARY

It is known that a vehicle in which the crankshaft of an internal combustion engine is connected to the rotating shaft of a motor generator (MG) via a torsional damper performs cranking using the MG. On the other hand, the downsizing of the MG is favorable from the viewpoint of vehicle mountability and cost. However, when the torque (MG torque) generated by the MG is reduced by the downsizing, there is a concern that the torque applied to the crank shaft by the MG due to cranking at the time of engine start may become small. Therefore, in order to reduce the size of the MG while reducing a decrease in cranking performance, it is favorable that the torque applied to the crankshaft at the time of cranking can be effectively increased without increasing the MG torque itself.

The present disclosure has been made in view of the problem described above, and an object of the present disclosure is to effectively increase the torque applied to a crankshaft at the time of cranking without increasing an MG torque itself in a powertrain system in which the crankshaft of an internal combustion engine is connected to a rotating shaft of a motor generator (MG) via a torsional damper.

A powertrain system according to the present disclosure includes an internal combustion engine, a motor generator and a control device. The internal combustion engine includes a crankshaft. The motor generator includes a rotating shaft connected to the crankshaft via a torsional damper. The control device is configured to control the internal combustion engine and the motor generator. The powertrain system is configured such that the crankshaft and the rotating shaft are not connected to a drive shaft of a vehicle equipped with the powertrain system at least at the time of engine start. Here, the direction of an MG torque, which is a torque output from the motor generator when the crankshaft is rotated in a forward rotation direction, is referred to as positive. The control device is configured to execute a cranking torque amplification control that controls the motor generator such that the MG torque output from the motor generator for cranking the internal combustion engine fluctuates in a resonant period of the torsional damper while making a fluctuation center of the MG torque higher than zero.

In the cranking torque amplification control, the control device may fluctuate the MG torque using a torque range on a positive side and a torque range on a negative side.

In the cranking torque amplification control, the control device may fluctuate the MG torque in a sine wave shape.

In the cranking torque amplification control, the control device may fluctuate the MG torque in a rectangular wave shape.

The control device may be configured to execute the cranking torque amplification control when outside air temperature is lower than a first threshold value.

The control device may be configured to execute the cranking torque amplification control when temperature of the internal combustion engine is lower than a second threshold value.

The control device may be configured to execute the cranking torque amplification control when voltage of a battery that supplies electric power to the motor generator is lower than a third threshold value.

The control device may be configured to execute the cranking torque amplification control when state of charge of a battery that supplies electric power to the motor generator is lower than a fourth threshold value.

The vehicle may be a series hybrid vehicle or a range extended electric vehicle in which the internal combustion engine is dedicated to electric power generation and the motor generator generates electric power using a motive power of the internal combustion engine.

According to the cranking torque amplification control of the powertrain system according to the present disclosure, the torsional resonance of the torsional damper can be used to amplify the crankshaft input torque with respect to the MG torque. As a result, cranking (engine start) can be performed with a small MG torque as compared with an example in which the MG torque is applied for cranking with a uniform torque value without the cranking torque amplification control. That is, according to powertrain system of the present disclosure, the torque (crankshaft input torque) applied to the crankshaft at the time of cranking can be effectively increased without increasing the MG torque itself. Also, the powertrain system according to the present disclosure is configured such that the crankshaft and the rotating shaft of the motor generator are not connected to the drive shaft of the vehicle at least at the time of engine start. Therefore, it is possible to execute the cranking torque amplification control while making it difficult to transmit, to the vehicle body side, the vibration caused by the occurrence of the torsional resonance.

DETAILED DESCRIPTION

Figure 1:
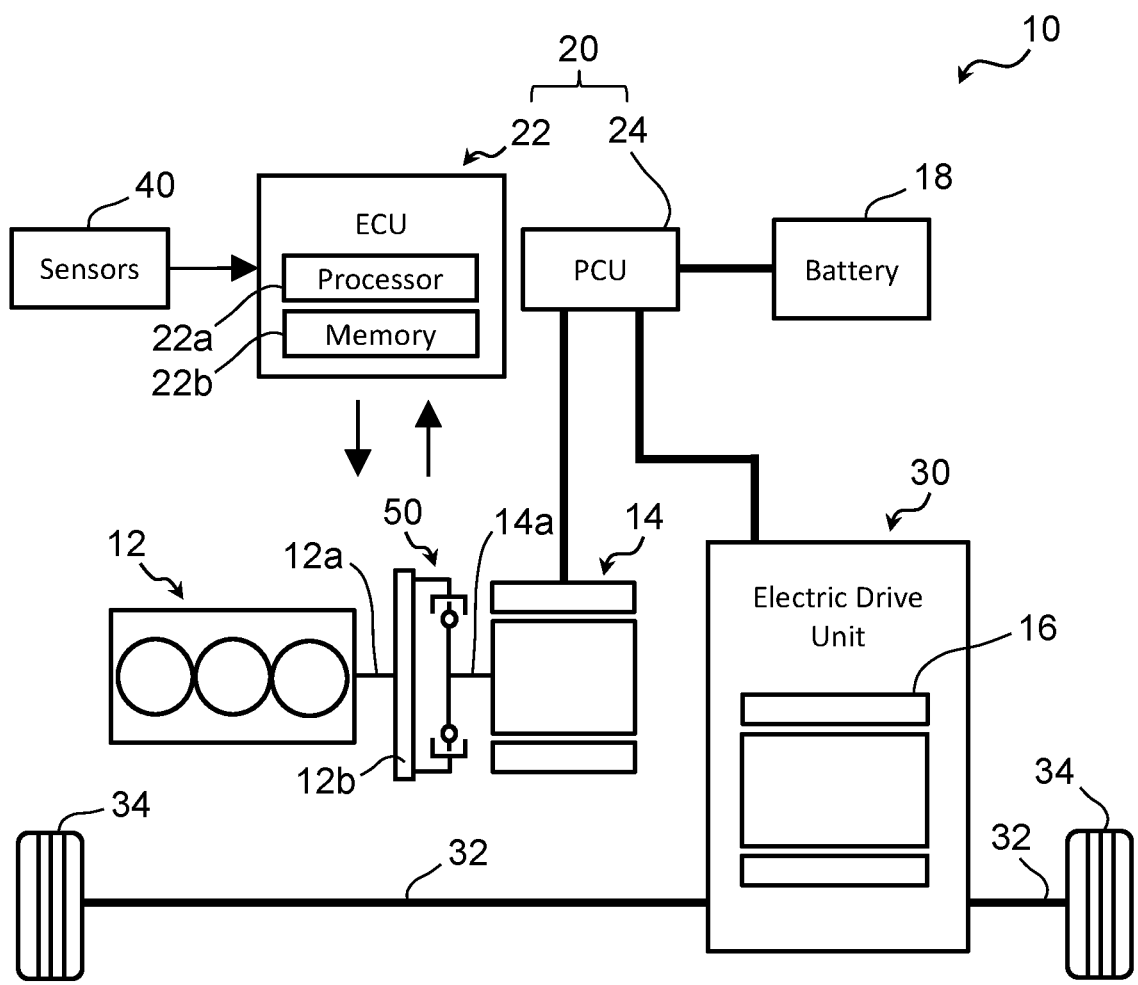
FIG. 1 is a schematic diagram showing an example of a configuration of a powertrain system according to a first embodiment of the present disclosure.

In the following embodiments of the present disclosure, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

A first embodiment according to the present disclosure will be described with reference to FIGS. 1 to 6.

1-1. Configuration Example of Powertrain System

FIG. 1 is a schematic diagram showing an example of a configuration of a powertrain system 10 according to the first embodiment. A vehicle equipped with the powertrain system 10 shown in FIG. 1 is a so-called series hybrid vehicle. The powertrain system 10 includes an internal combustion engine 12, a first motor generator (first MG) 14, a second motor generator (second MG) 16, a battery (DC power supply) 18 that stores electric power supplied to the first MG 14 and the second MG 16, and a control device 20.

The internal combustion engine 12 is a spark ignition engine as an example. A crankshaft 12a of the internal combustion engine 12 is connected to a rotating shaft 14a of the first MG 14 via a torsional damper 50 described below. The first MG 14 and the second MG 16 are, for example, three-phase AC motor generator. It should be noted that, as an example, the reduction ratio between the crankshaft 12a and the rotating shaft 14a of the first MG 14 is 1, but the reduction ratio may be set by any value.

The control device 20 is configured to control the internal combustion engine 12, the first MG 14 and the second MG 16. The control device 20 includes an electronic control unit (ECU) 22 and a power control unit (PCU) 24. The PCU 24 is a power converter including inverters for driving the first MG 14 and the second MG 16, and controls the first MG 14 and the second MG 16 based on commands from the ECU 22.

The first MG 14 mainly functions as a generator. In detail, the first MG 14 performs power generation using the motive power of the internal combustion engine 12. The PCU 24 converts the electric power generated by the first MG 14 from alternating current to direct current and stores the converted electric power in the battery 18. As a result, the battery 18 is charged. The first MG 14 also functions as an electric motor at the time of engine start-up. More specifically, when the internal combustion engine 12 is started, the PCU 24 converts the electric power stored in the battery 18 from direct current to alternating current and supplies the converted electric power to the first MG 14, and the first MG 14 generates an MG Torque Tmg to crank the internal combustion engine 12.

The second MG 16 is housed in an electric drive unit 30 together with gears (not shown) such as differential gears. The second MG 16 mainly functions as an electric motor to drive the vehicle. More specifically, the PCU 24 converts the electric power stored in the battery 18 from direct current to alternating current and supplies the converted electric power to the second MG 16, and the second MG 16 generates a torque for driving drive shafts 32 and vehicle wheels 34 connected thereto. As a result, the vehicle (vehicle wheels 34) is driven.

The internal combustion engine 12 is connected to the first MG 14 as described above, but is not connected to the drive shafts 32. That is, the internal combustion engine 12 is dedicated to electric power generation, and the internal combustion engine 12 and the first MG 14 are always disconnected from the drive shaft 32, not only when the internal combustion engine 12 is started. It should be noted that the first MG 14 corresponds to an example of the "motor generator" according to the present disclosure.

The ECU 22 includes a processor 22a and a memory 22b. The memory 22b stores various data including maps and various control programs. The various data and control programs are used for the control of the internal combustion engine 12, the first MG 14 and the second MG 16. The processor 22a reads a control program from the memory 22b and executes it, and thereby, various kinds of processing and control by the control device 20 are achieved. It should be noted that the control device 20 may be configured using a plurality of ECUs. In detail, the control device 20 may individually include, for example, an ECU that collectively controls the powertrain system 10, an ECU that controls the internal combustion engine 12, an ECU that controls the first MG 14, and an ECU that controls the second MG 16.

The control device 20 (ECU 22) further receives sensor signals from sensors 40 for controlling the operation of the powertrain system 10. The sensors 40 include a crank angle sensor configured to detect a rotation angle (crank angle) of the crank shaft 12a, a resolver (rotation angle sensor) configured to detect a rotation angle of the rotating shaft 14a of the first MG 14, an outside air temperature sensor configured to detect an outside air temperature, an engine water temperature sensor configured to detect an engine cooling water temperature, a battery voltage sensor configured to detect a voltage of the battery 18, and a battery current sensor configured to detect an electric current flowing through the battery 18. The ECU 22 can calculate an engine speed Ne based on signals of the crank angle sensor. Moreover, the battery current sensor is used to calculate a charging rate (i.e., State of Charge (SOC)) of the battery 18.

The vehicle on which the powertrain system 10 is mounted is a series hybrid vehicle as already described. Moreover, the vehicle to which the present disclosure is applied may be a plug-in series hybrid vehicle in which an external charging function is added to the powertrain system 10. Furthermore, the vehicle to which the present disclosure is applied may be a so-called range extended electric vehicle (REEV). This kind of range extended electric vehicle can be configured by, for example, adding an external charging function while using the basic configuration of the powertrain system 10 shown in FIG. 1 and increasing the capacity of the battery 18.

Figure 2:
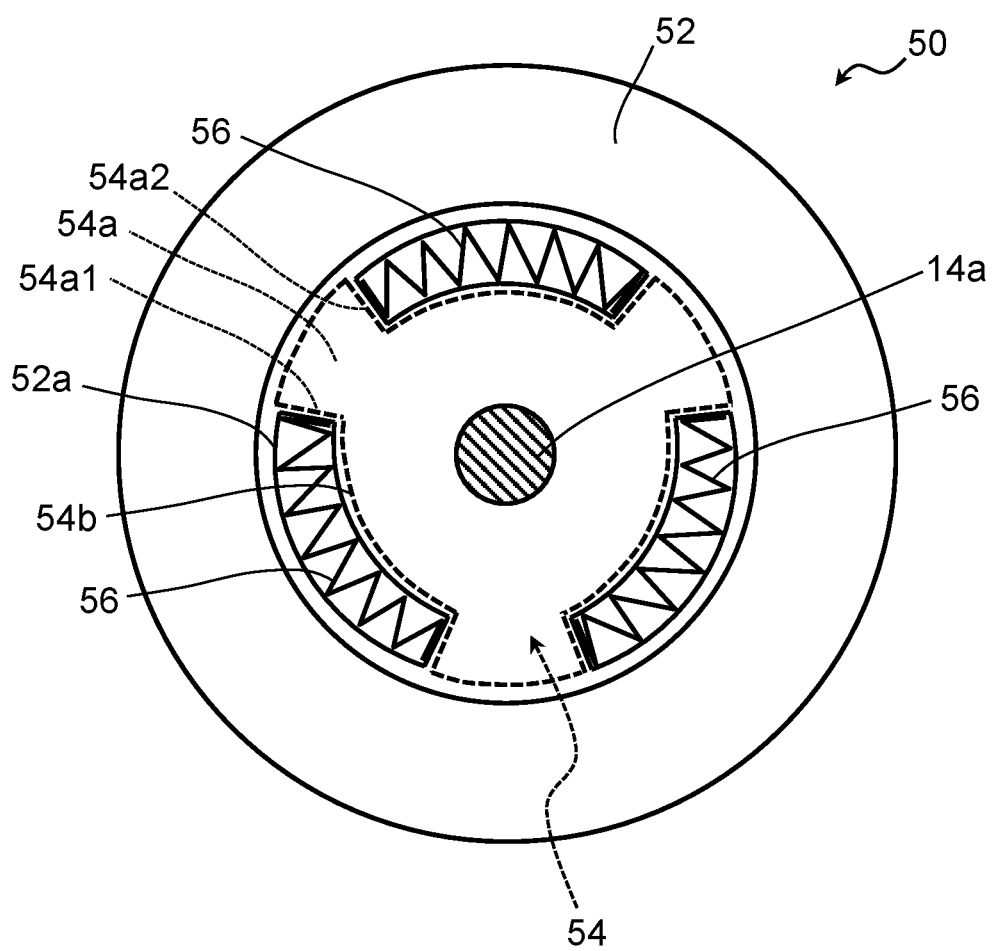
FIG. 2 is a schematic diagram showing an example of a specific configuration of a torsional damper shown in FIG. 1 of the present disclosure.

FIG. 2 is a schematic diagram showing an example of a specific configuration of the torsional damper 50 shown in FIG. 1, and is a view of the torsional damper 50 from the direction of the rotating shaft 14a of the first MG 14. As shown in FIG. 2, the torsional damper 50 mainly includes a disc plate 52, a hub plate 54, and a plurality of (three as an example) coil springs 56.

The disc plate 52 is formed in a substantially disc shape, and rotates integrally with a flywheel 12b (see FIG. 1) fixed to the end of the crankshaft 12a on the first MG 14 side. The hub plate 54 is formed in a substantially disc shape, and rotates integrally with the rotating shaft 14a of the first MG 14. The disc plate 52, is formed with three openings 52a for accommodating and holding the three coil springs 56, respectively. The three openings 52a are arranged at equal intervals along the circumferential direction of the disc plate 52, and each of the openings 52a is formed so as to extend in the circumferential direction. Three projections 54a are formed on the hub plate 54. Each of the three protrusions 54a protrudes from an outer peripheral surface 54b of the hub plate 54 located radially inward with respect to the coil spring 56 toward a radially outer space existing between two adjacent coil springs 56. Then, the individual protrusions 54a are in contact with the adjacent coil springs 56 at their respective end faces 54a1 and 54a2 in the circumferential direction.

According to the torsional damper 50 configured as described above, when a relative rotation (torsion) occurs between the disc plate 52 (the crankshaft 12a) and the hub plate 54 (the rotating shaft 14a of the first MG 14), the coil spring 56 sandwiched between the end face 54a1 or 54a2 and a wall surface of the opening 52a compresses and generates an elastic force against the torsion. Therefore, according to the torsional damper 50, vibration caused by the torsion can be reduced or damped within a range in which the coil spring 56 can be contracted.

1-2. Engine Start Control

The ECU 22 executes an engine start control to start the internal combustion engine 12 when a designated engine start condition is satisfied. This engine start control involves cranking of the internal combustion engine 12. The cranking in the present embodiment is performed by a "cranking torque amplification control (also simply referred to as a "torque amplification control") described below.

1-2-1. Outline of Cranking Torque Amplification Control

Figure 3:
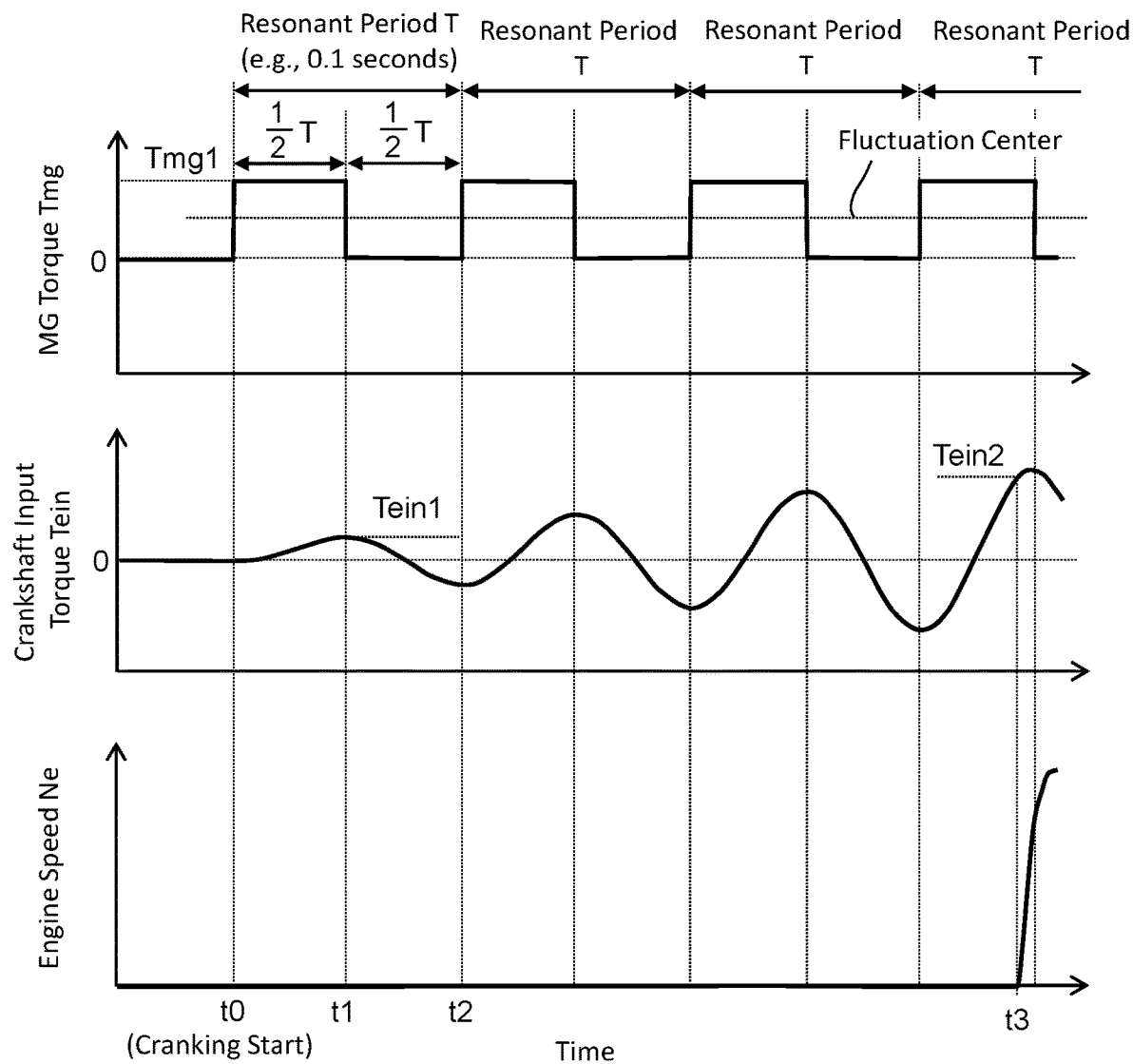
FIG. 3 is a time chart showing an outline of a cranking torque amplification control according to the first embodiment of the present disclosure.

FIG. 3 is a time chart showing the outline of the cranking torque amplification control according to the first embodiment. FIG. 3 shows a waveform of the "MG torque Tmg" which is the torque output from the first MG 14 for cranking, a waveform of a "crankshaft input torque Tein" which is the torque input from the first MG 14 to the crankshaft 12a via the torsional damper 50, and a waveform of the engine speed Ne. It should be noted that, in the present specification, the directions of the MG torque Tmg and the crankshaft input torque Tein are positive when the MG torque Tmg and the crankshaft input torque Tein act to drive the crankshaft 12a in the forward (normal) rotation direction (i.e., at the time of cranking).

A time point t0 in FIG. 3 corresponds to the start time point of the cranking (i.e., the torque amplification control). During general cranking, a constant MG torque Tmg is continuously applied over a designated time period. In contrast, in the torque amplification control according to the present embodiment, as shown in FIG. 3, the first MG 14 is controlled such that the MG torque Tmg after the start of cranking fluctuates in a resonant period T of the torsional damper 50. The resonant period T of the torsional damper 50 (powertrain system 10) is 0.1 seconds as an example.

Specifically, the application of a torque value Tmg1 having a designated magnitude is started from the start time point t0 of cranking. The torque value Tmg1 is, for example, the rated torque of the first MG 14. The application of the torque value Tmg1 is continued from the time point t0 to a time point t1 at which the half of the resonant period T elapses. Then, after the elapse of the time point t1, the MG torque Tmg is set to zero from the time point t1 to a time point t2 at which the remaining half of the resonant period T elapses. Also, in each resonant period T that arrives after the first resonant period T has elapsed, MG torque Tmg is applied with a waveform similar to the waveform from the time point t0 to the time point t2. In other words, the MG torque Tmg is alternately changed between the torque value Tmg1 and zero every half of the resonant period T.

When the MG torque Tmg is continuously changed with the resonant period T as described above, the torsional resonance of the torsional damper 50 is excited. Due to the effect of this torsional resonance, the crankshaft input torque Tein is amplified while fluctuating as shown in FIG. 3. Then, as shown in FIG. 3, the fluctuation of the MG torque Tmg is performed while the fluctuation center is set to be higher than zero. As a result, the crankshaft input torque Tein is amplified while greatly changing to the positive side as compared with the negative side.

At a time point t3 in FIG. 3, as a result of the amplification of the crankshaft input torque Tein, the crank shaft input torque Tein overcomes the internal friction force (static friction force) and the compression pressure of the internal combustion engine 12, and the crankshaft 12a starts to rotate. Although not shown in FIG. 3, the amplification of the crankshaft input torque Tein is also continued by continuing the fluctuation of the MG torque Tmg even at and after the time point t3. As a result, the engine speed Ne increases.

The torque amplification control is performed until, for example, the engine speed Ne reaches a designated threshold value THne. An example of the threshold value THne is the initial explosion speed (about 500 rpm) at which the initial explosion of the internal combustion engine 12 occurs. According to the present embodiment, with the end of the torque amplification control, the cranking itself also ends. Instead of this kind of example, cranking may be continued for any designated time period at a constant MG torque Tmg (e.g., the torque value Tmg1) in order to assist the engine rotation after the engine speed Ne reaches the threshold value THne and the torque amplification control ends. This designated time period can be, for example, set as a time period from the time point t3 until the engine speed Ne reaches a designated complete explosion speed (i.e., until it can be determined that the internal combustion engine 12 can be reliably operated independently).

In a comparative example in which the torque value Tmg1 is continuously applied without the torque amplification control according to the present embodiment, only the crankshaft input torque Tein having a torque value Tein1 shown in FIG. 3 can be continuously generated. A torque value Tein2 in FIG. 3 is an example of a torque value required to start rotating the crankshaft 12a at a low temperature where the friction of the internal combustion engine 12 increases, and is greater than the torque value Tein1. Therefore, in the comparative example described above, the crankshaft 12a cannot be rotated. Accordingly, in order to enable the crankshaft 12a to rotate in this comparative example, it is necessary to increase the size of the first MG 14 or separately include a starter motor such that the crankshaft input torque Tein having a torque value Tein2 or more can be applied. This is unfavorable from the view point of vehicle mountability and cost of the powertrain system.

In contrast, according to the torque amplification control, by using the torsional resonance of the torsional damper 50, it becomes possible to amplify the crankshaft input torque Tein to a value greater than the torque value Tein2 (for example, 150 Nm) with a small torque value Tmg1 (for example, 20 Nm) and perform cranking.

Additionally, the above-described threshold value THne is not limited to the initial explosion speed of the internal combustion engine 12, and may be a higher value than the initial explosion speed (e.g., the complete explosion speed). Alternatively, the threshold value THne may be a value lower than the initial explosion speed. Moreover, when the crankshaft 12a starts to rotate, each sliding portion of the internal combustion engine 12 changes from the static friction state to the dynamic friction state, and the torque required for the rotation of the crankshaft 12a becomes small. Therefore, for example, the torque amplification control may be ended when the torque amplification control detects that the crankshaft 12a has started to rotate, and a constant MG torque Tmg (e.g., the torque value Tmg1) may be applied to the crankshaft 12a for cranking over a subsequent designated time period.

1-2-2. Abort Determination Processing Associated with Cranking Torque Amplification Control The ECU 22 may execute the following abort determination processing in parallel during the execution of the torque amplification control. When the ECU 22 aborts the torque amplification control in response to the result of this kind of abort determination processing, the ECU then executes the following processing. That is, for example, the ECU 22 uses a vehicle information display panel in the vehicle interior to notify the user of the vehicle that the engine cannot be started due to reasons such as low outside air temperature. Alternatively, when the vehicle equipped with the powertrain system 10 is a plug-in hybrid vehicle can perform external charging, the ECU 22 requests the user to perform external charging by using, for example, the vehicle information display panel.

A torsion angle $\omega$ [rad] in the torsional damper 50 can be obtained as the difference in the rotation angle of the rotating shaft 14a of the first MG 14 with respect to the rotation angle (crank angle) of the crankshaft 12a. Because of this, the torsional angle $\omega$ during the execution of the abort determination processing can be calculated using the signals of the crank angle and the rotation angle of the rotating shaft 14a that are respectively detected using the crank angle sensor and the resolver described above.

Specific Example 1

Figure 4A:
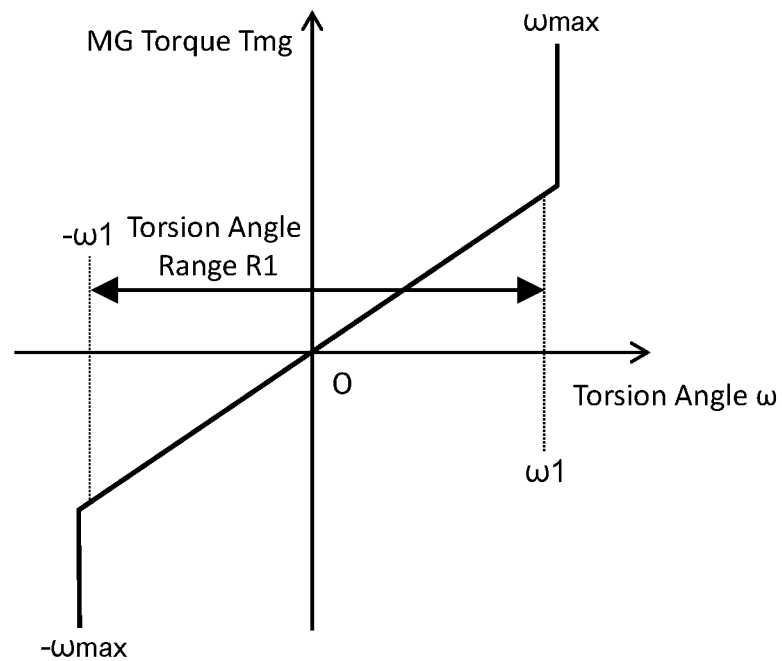
FIG. 4A is a diagrams used to describe a specific example 1 of an abort determination processing.
Figure 4B:
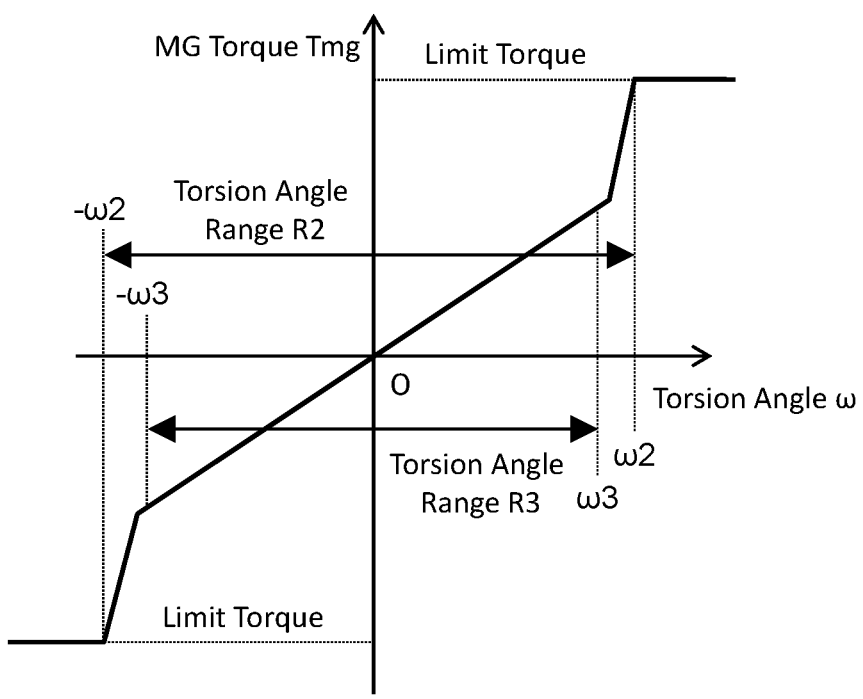
FIG. 4B is a diagrams used to describe specific examples 2 and 3 of the abort determination processing.

FIGS. 4A and 4B are diagrams used to describe specific examples 1-3 of the abort determination processing. First, FIG. 4A shows the specific example 1 of the abort determination processing applied to the torsional damper 50 having the configuration shown in FIG. 2. The torsional damper 50 is a limiterless torsional damper that does not have a torque limiter device described below. As shown in FIG. 4A, the torsion angle $\omega$ is proportional to the MG torque Tmg. Also, in the torsional damper 50, the torsion can be permitted within a torsion angle range corresponding to the length of the coil spring 56 (Maximum torsion angle $-\omega_{max}$ on the negative side<Torsion angle range $\omega$<Maximum torsion angle $\omega_{max}$ on the positive side). On the other hand, when the torsion angle $\omega$ reaches the maximum torsion angle $\omega_{max}$ on the positive side or the maximum torsion angle $-\omega_{max}$ on the negative side, there is a concern that sound may be generated due to the collision between the disc plate 52 and the hub plate 54 via the coil spring 56, or excessive torque may be transmitted from the hub plate 54 to the disc plate 52.

Therefore, according to the specific example 1 of the abort determination processing, the ECU 22 repeatedly determines whether or not the torsion angle $\omega$ is within a designated torsion angle range R1 based on the signals from the crank angle sensor and the resolver described above. This torsion angle range R1 is a range from a torsion angle $\omega$1 smaller by a designated amount than the maximum torsion angle $\omega_{max}$ on the positive side to a torsion angle $-\omega$1 smaller in absolute value by a designated amount than the maximum torsion angle $-\omega_{max}$ on the negative side. The ECU 22 continues the torque amplification control when the torsion angle $\omega$ is within the torsion angle range R1. On the other hand, the ECU 22 aborts the torque amplification control when the torsion angle ω deviates from the torsion angle range R1. As a result, the torque amplification control can be executed while avoiding the occurrence of collision noise and excessive torque described above.

Specific Examples 2 and 3

Then, the specific examples 2 and 3 of the abort determination processing will be described with reference to FIG. 4B. A torsional damper is known in which a torque limiter device (not shown) is added to the torsional damper 50 as shown in FIG. 2. The specific example 2 is applied to this kind of torsional damper. Furthermore, a torsional damper is known in which, for example, a rubber cushion member (not shown) is added to the inside of the coil spring 56 of the torsional damper 50 is known. The specific example 3 is applied to this kind of torsional damper. Then, FIG. 4B shows the characteristics of the torsional damper in which both the torque limiter device and the cushion member are added to the torsional damper 50.

The torque limiter device described above has a function of preventing the MG torque Tmg equal to or higher than a designated limit torque (see FIG. 4B) from being transmitted to the crankshaft 12a side. More specifically, the torque limiter device includes a friction material provided on the flywheel 12b side and a friction material provided on the disc plate 52 side, and is configured to prevent torque transmission by causing slippage between these friction materials when an MG torque Tmg equal to or higher than the limit torque is input. Torsional angles ω2 and −ω2 in FIG. 4B are the values of the torsional angles ω obtained when the MG torque Tmg reaches the limit torque. According to the specific example 2 of the abort determination processing, the ECU 22 repeatedly determines whether or not the torsion angle ω is within a designated torsion angle range R2 based on the signals of the crank angle sensor and the resolver described above. This torsion angle range R2 is a range of the torsion angle ω from the torsion angle ω2 to the torsion angle −ω2. The ECU 22 continues the torque amplification control when the torsion angle ω is within the torsion angle range R2. On the other hand, the ECU 22 aborts the torque amplification control when the torsion angle ω deviates from the torsion angle range R2. As a result, the torque amplification control can be executed while reducing the consumption of the friction materials due to the occurrence of slippage of the torque limiter device.

Furthermore, the cushion member described above has a function as a stopper for preventing overcompression of the coil spring 56. According to the specific example 3 of the abort determination processing, the ECU 22 repeatedly determines whether or not the torsion angle ω is within a designated torsion angle range R3 based on the signals of the crank angle sensor and the resolver described above. This torsion angle range R3 is a range of the torsion angle ω from the torsion angle ω2 smaller by a designated amount than a torsion angle at which the hub plate 54 comes into contact with the cushion member on the positive side, to the torsion angle −ω2 smaller in absolute value by a designated amount than a torsion angle at which the hub plate 54 comes into contact with the cushion member on the negative side. The ECU 22 continues the torque amplification control when the torsion angle ω is within the torsion angle range R3. On the other hand, the ECU 22 aborts the torque amplification control when the torsion angle ω deviates from the torsion angle range R3. As a result, the torque amplification control can be executed while avoiding the occurrence of sound due to the collision between the hub plate 54 and the cushion member.

1-2-3. Processing by Control Device (ECU)

Figure 5:
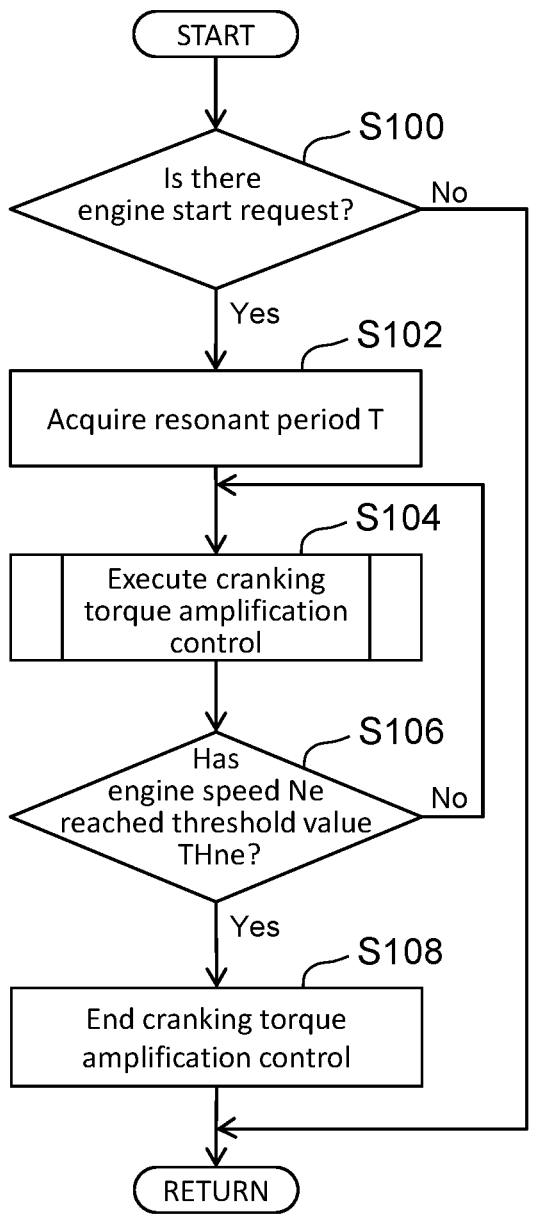
FIG. 5 is a flowchart showing a main routine of processing relating to the cranking torque amplification control according to the first embodiment of the present disclosure.

FIG. 5 is a flowchart showing a main routine of processing relating to the cranking torque amplification control according to the first embodiment. The processing of the present main routine is repeatedly executed while the vehicle system is being driven. It should be noted that the abort determination processing described above (for example, the specific example 1) is repeatedly executed in parallel with the execution of the torque amplification control according to the main routine shown in FIG. 5.

According to the main routine shown in FIG. 5, first, in step S100, the control device 20 (ECU 22) determines whether or not there is an engine start request. Whether or not there is an engine start request is determined based on whether or not a designated engine start condition, such as the fact that there is a request to charge the battery 18 (SOC≤designated lower limit value), is satisfied. As a result, if there is no engine start request, the ECU 22 ends the processing of the present main routine.

If, on the other hand, an engine start request is issued, the ECU 22 proceeds to step S102 and acquires a resonant period T of the torsional damper 50. The resonant period T takes a value depending on the moment of inertia of each of the internal combustion engine 12 and the first MG 14 and the torsional rigidity of the torsional damper 50. The ECU 22 stores the resonant period T calculated in advance, and acquires the stored value in this step S102. Thereafter, the ECU 22 proceeds to step S104.

Figure 6:
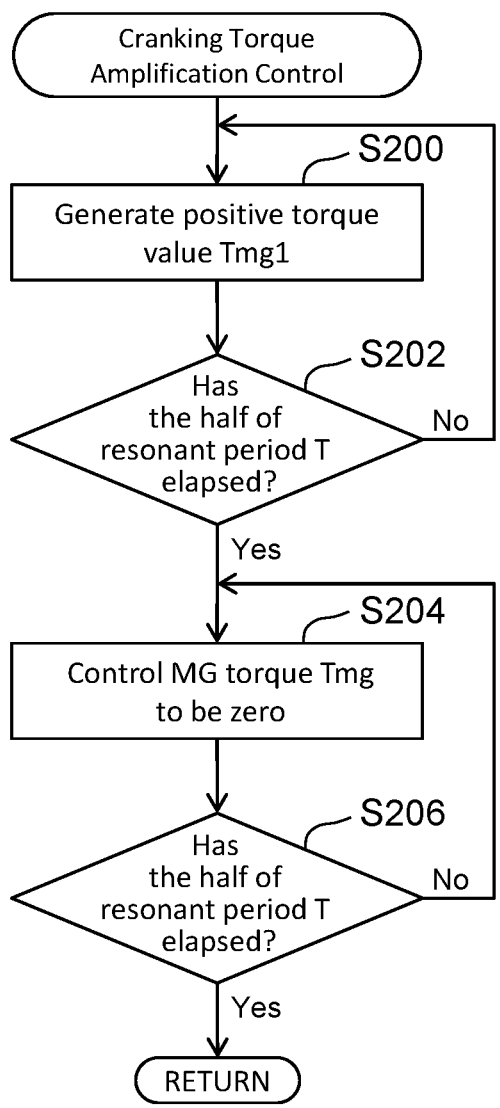
FIG. 6 is a flowchart showing a subroutine of processing of step S104 in FIG. 5.

In step S104, the ECU 22 executes the torque amplification control by executing the processing of a subroutine shown in FIG. 6. Then, the ECU 22 executes determination of the next step S106 after starting the torque amplification control by the processing of step S104.

In step S106, the ECU 22 determines whether or not the engine speed Ne detected by the crank angle sensor has reached the threshold value THne described above. As a result, while the engine speed Ne has not yet reached the threshold value THne, the ECU 22 repeatedly executes the processing of step S104. That is, the torque amplification control is continued. If, on the other hand, the engine speed Ne has reached the threshold value THne, the ECU 22 proceeds to step S108 and ends the torque amplification control by stopping the processing of the subroutine shown in FIG. 6.

FIG. 6 is a flowchart showing the subroutine of the processing of step S104 in FIG. 5. According to this subroutine, first, in step S200, the ECU 22 controls the PCU 24 so as to generate the MG torque Tmg having the torque value Tmg1 (see FIG. 3). Thereafter, the ECU 22 proceeds to step S202.

In step S202, the ECU 22 determines whether or not the half of the resonant period T acquired in step S102 has elapsed from the latest start time point of the processing of step S200. As a result, if the half of the resonant period T has not yet elapsed, the ECU 22 continuously executes the processing of step S200. If, on the other hand, the half of the resonant period T has elapsed, the ECU 22 proceeds to step S204.

In step S204, the ECU 22 controls the PCU 24 such that the MG torque Tmg becomes zero. Thereafter, ECU 22 proceeds to step S206.

In step S206, the ECU 22 determines whether or not the half of the resonant period T acquired in step S102 has elapsed from the latest start time point of the processing of step S204. As a result, if the half of the resonant period T has not yet elapsed, the ECU 22 continuously executes the processing of step S204.

If, on the other hand, the half of the resonant period T has elapsed in step S206, the ECU 22 execute the processing of step S200 and the subsequent steps again on condition that the determination result of step S106 described above is negative. In addition, when the determination result of S106 becomes positive during the execution of the processing of the subroutine shown in FIG. 6, the ECU 22 ends the processing of the subroutine.

1-3. Effect

As described so far, according to the torque amplification control of the present embodiment, the torsional resonance of the torsional damper 50 can be used to amplify the crankshaft input torque Tein with respect to the MG torque Tmg. As a result, cranking (engine start) can be performed with a small MG torque Tmg as compared with an example in which the MG torque Tmg having a uniform torque value is applied for cranking without the torque amplification control. Thus, by executing the torque amplification control, the torque (crankshaft input torque Tein) applied to the crankshaft 12a at the time of cranking can be effectively increased without increasing the MG torque Tmg itself. As a result, the size of the first MG 14 can be reduced. The downsizing of the first MG 14 is favorable from the viewpoint of vehicle mountability and cost.

Moreover, the powertrain system 10 is a series type system in which the crankshaft 12a and the rotating shaft 14a of the first MG 14 are always disconnected from the drive shafts 32. By executing the torque amplification control in this kind of series hybrid vehicle (the same for the range extended electric vehicle), it becomes possible to execute the torque amplification control while making it difficult to transmit the vibration caused by the occurrence of the torsional resonance to the vehicle body side.

Additionally, by using the torque amplification control, it is possible to easily construct a powertrain system that ensures good cranking performance without separately providing a starter motor.

2. Second Embodiment

Then, a second embodiment according to the present disclosure will be described with reference to FIG. 7.

2-1. Cranking Torque Amplification Control

The second embodiment is different from the first embodiment described above in the following points. That is, in the first embodiment, the torque amplification control is always executed without any special execution conditions if there is an engine start request. On the other hand, a torque amplification control according to the present embodiment is executed only when the following amplification control execution condition is satisfied.

The amplification control execution condition used in the present embodiment is set using the outside air temperature, the engine water temperature, and the voltage and SOC (i.e., charging rate) of the battery 18. To be more specific, the amplification control execution condition is satisfied when at least one of the following first to fourth conditions is satisfied. The first condition is that the outside air temperature is lower than a first threshold value TH1. The second condition is that the engine water temperature is lower than a second threshold value TH2. The third condition is that the battery voltage is lower than a third threshold value TH3. The fourth condition is that the SOC is lower than a fourth threshold value TH4. It should be noted that the engine water temperature is an example of the temperature of the internal combustion engine 12. The temperature of the internal combustion engine 12 for determining the second condition is not limited to the engine water temperature as long as the engine temperature can be evaluated, and may be, for example, engine lubricating oil temperature.

Figure 7:
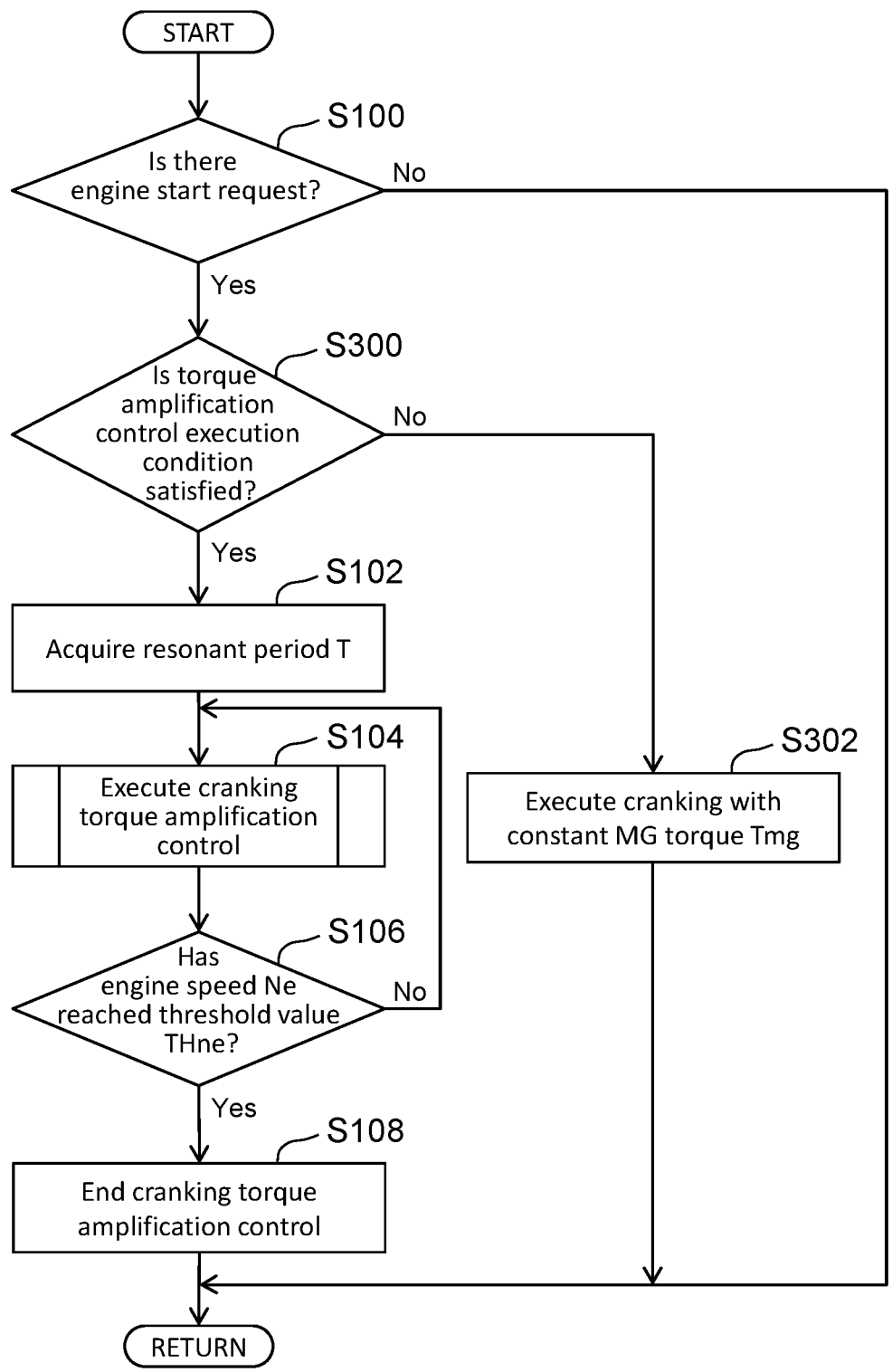
FIG. 7 is a flowchart showing a main routine of processing relating to a cranking torque amplification control according to a second embodiment of the present disclosure.

FIG. 7 is a flowchart showing a main routine of processing relating to the cranking torque amplification control according to the second embodiment. The processing of steps S100-S108 in FIG. 7 is as described above in the first embodiment.

According to the main routine shown in FIG. 7, when the engine start request is issued (step S100; YES), the control device 20 (ECU 22) proceeds to step S300. In step S300, it is determined whether or not the above-described amplification control execution condition (at least one of the first to fourth conditions) is satisfied. The outside air temperature, the engine water temperature, the battery voltage and the SOC can be detected or calculated using the sensors 40 described above. For example, preset values can be used as the first to fourth threshold values.

To be more specific, as described with reference to FIG. 3, when the temperature of the internal combustion engine 12 is low because the outside air temperature is low, the friction of the internal combustion engine 12 increases. As a result, the crankshaft input torque Tein required to start rotating the crankshaft 12a increases. Because of this, the first threshold value of the outside air temperature is set in advance as a value that can determine whether or not a low outside air temperature condition in which the crankshaft input torque Tein required for cranking is insufficient has arrived. In detail, the first threshold value can be set in advance as, for example, a value that can determine the presence or absence of the arrival of the low outside air temperature condition in which the crankshaft input torque Tein for cranking is insufficient only by continuously generating the rated torque (torque value Tmg1) of the first MG 14.

Similarly to the first threshold value, the second threshold value of the engine water temperature (the temperature of the internal combustion engine 12) is set in advance as a value that can determine the presence or absence of the arrival of a low engine water temperature condition in which the crankshaft input torque Tein required for cranking is insufficient.

Moreover, when the voltage of the battery 18 is lowered, the MG torque Tmg itself that can be generated by the first MG 14 decreases. Because of this, even when the internal combustion engine 12 is sufficiently warmed up, if the battery voltage is low, the crankshaft input torque Tein for cranking may be insufficient. The third threshold value is set in advance as a value that can determine the presence or absence of the arrival of a low battery voltage condition in which this kind of situation may occur.

Furthermore, when the SOC of the battery 18 is low, it is required that cranking can be performed while keeping the MG torque Tmg low in order to reduce the power consumption of the first MG 14 required for cranking. The fourth threshold value is set in advance as, for example, a value that can determine the presence or absence of the arrival of a low battery charge rate condition with this kind of request.

According to the main routine shown in FIG. 7, if the amplification control execution condition is not satisfied in step S300, the ECU 22 proceeds to step S302. In step S302, the ECU 22 controls the first MG 14 so as to continuously generate a constant MG torque Tmg (for example, the torque value Tmg1) for a designated cranking execution time period.

If, on the other hand, the amplification control execution condition is satisfied in step S300, the ECU 22 proceeds to step S102 and executes the torque amplification control in the same manner as in the first embodiment.

2-2. Effect

According to the second embodiment described above, the torque amplification control is executed only when the amplification control execution condition is satisfied. Therefore, the system can be constructed such that the torque amplification control can be executed only under the conditions that requires the torque amplification control, such as the low outside air temperature condition described above.

Additionally, in the amplification control execution condition according to the second embodiment, all of the above-described first to fourth conditions are used. On the other hand, in another example of the amplification control execution condition, any one, two or three of the first to fourth conditions may be used.

3. Third Embodiment

Figure 8:
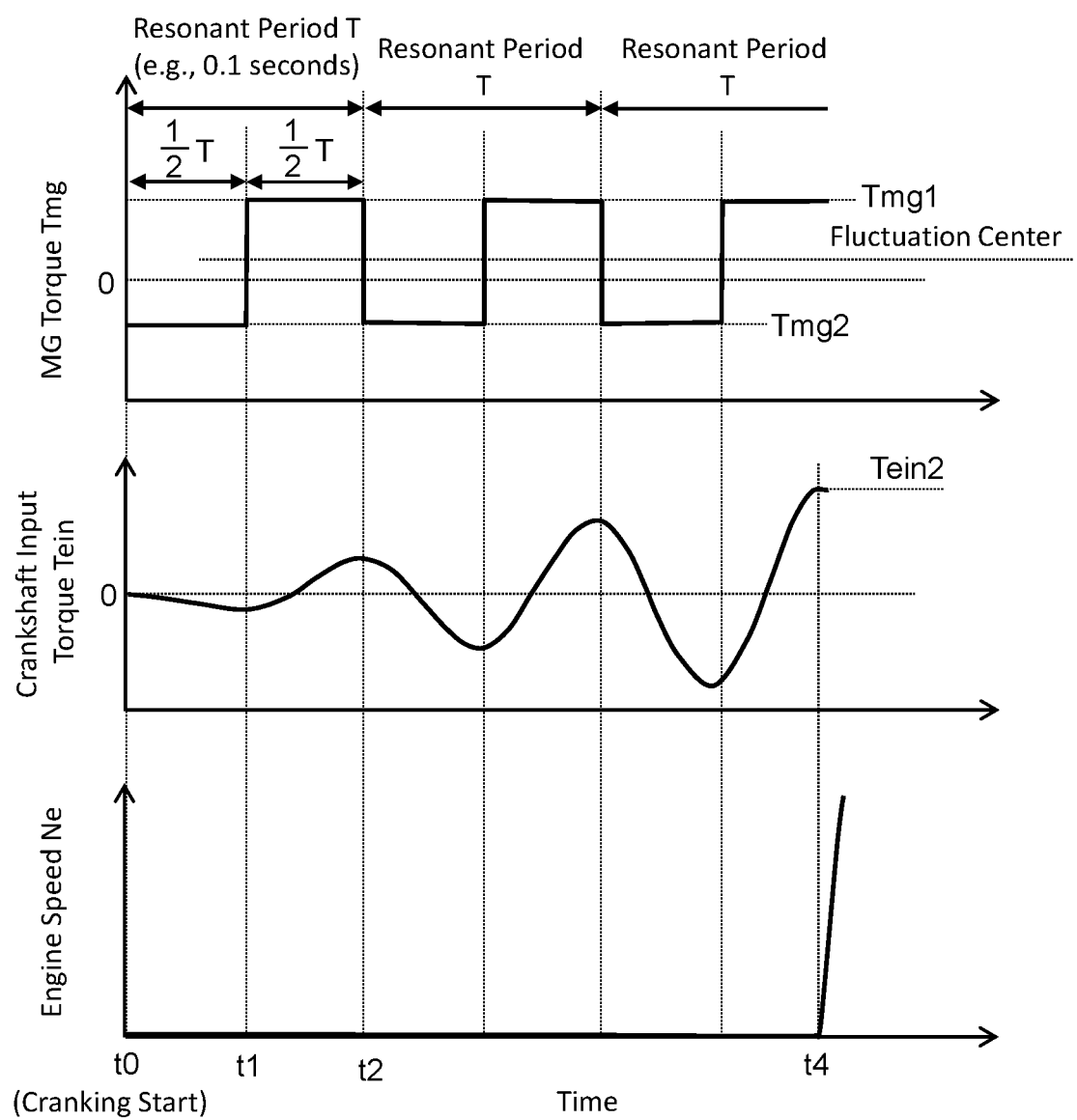
FIG. 8 is a time chart showing an outline of a cranking torque amplification control according to a third embodiment of the present disclosure.

Then, a third embodiment according to the present disclosure will be described with reference to FIGS. 8 and 9.

3-1. Cranking Torque Amplification Control

The third embodiment is different from the first embodiment described above in the following points. FIG. 8 is a time chart showing the outline of a cranking torque amplification control according to the third embodiment.

In the torque amplification control according to the first embodiment, as shown in FIG. 3, the MG torque Tmg is alternately changed between the torque value Tmg1 and zero every half of the resonant period T. That is, the MG torque Tmg fluctuates using only the torque range on the positive side. In contrast, in the present embodiment, the fluctuation of the MG torque Tmg is executed using the torque range on the positive side and the torque range on the negative side, as shown in FIG. 8.

More specifically, in the present embodiment, the MG torque Tmg is alternately changed, for example, between the positive torque value Tmg1 and a negative torque value Tmg2 every half of the resonant period T. This negative torque value Tmg2 is set such that the absolute value thereof is smaller than the torque value Tmg1. That is, even in the example shown in FIG. 8, in order to prevent reverse rotation of the crankshaft 12a, the fluctuation center of the MG torque Tmg during the execution of the torque amplification control is set to be higher than zero (i.e., so as to be located within the positive torque range). Furthermore, in the example shown in FIG. 8, the negative torque value Tmg2 is applied from the start time point t0 of cranking to the time point t1 at which the half of the resonant period T elapses, and, on the other hand, the positive torque value Tmg1 is applied from the elapse of the time point t1 until the time point t2 at which the remaining half of the resonant period T elapses. Instead of this kind of example, the positive torque value Tmg1 may be applied prior to the negative torque value Tmg2 after cranking (torque amplification control) is started, as in the processing of a subroutine shown in FIG. 9 described below.

Figure 9:
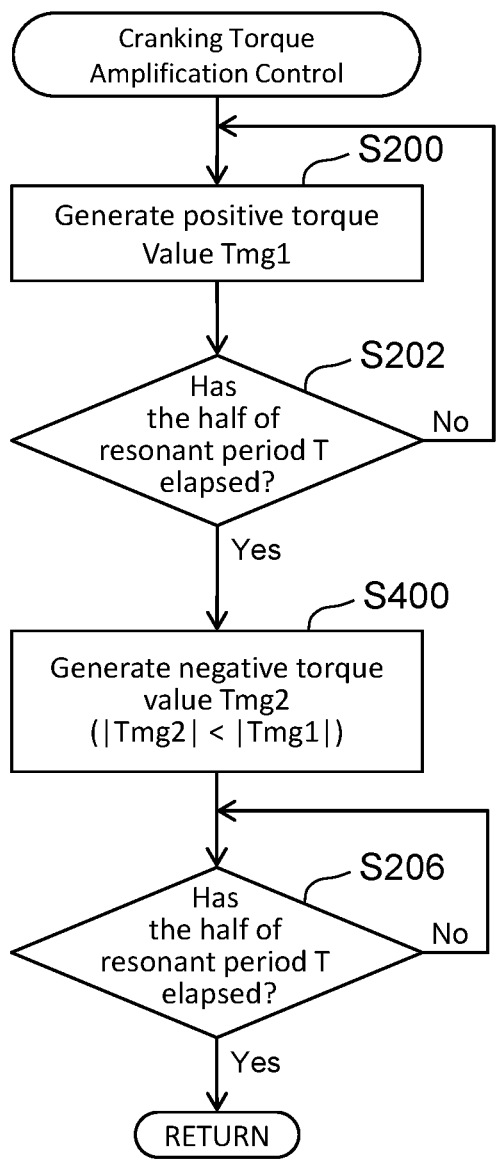
FIG. 9 is a flowchart showing a subroutine of the cranking torque amplification control used in the third embodiment of the present disclosure.

FIG. 9 is a flowchart showing the subroutine of the cranking torque amplification control used in the third embodiment. As an example of the main routine related to the torque amplification control according to the present embodiment, basically, the main routine shown in FIG. 5 according to the first embodiment or the main routine shown in FIG. 7 according the second embodiment can be used. This also applies to fourth and fifth embodiments described below. According to the present embodiment, instead of the processing of the subroutine shown in FIG. 6 associated with step S104, the processing of the subroutine shown in FIG. 9 is executed.

The subroutine shown in FIG. 9 is the same as the subroutine shown in FIG. 6 except that the processing of step S204 is replaced with the following step S400. In step S400, the ECU 22 controls the PCU 24 such that the MG torque Tmg has the negative torque value Tmg2 described above. As already described, the absolute value of the negative torque value Tmg2 is smaller than that of the positive torque value Tmg1.

3-2. Effect

According to the torque amplification control of the third embodiment described so far, the MG torque Tmg fluctuates using not only the torque range on the positive side but also the torque range on the negative side. This allows the torque amplification control to be executed while significantly changing the torsion angle co of the torsional damper 50 as compared with the first embodiment in which the torque range on the negative side is not used. As a result, the torsional resonance can be excited faster, and the crankshaft input torque Tein can be changed with a greater width of change at an earlier timing. Therefore, as compared with the first embodiment, the time point (in FIG. 8, a time point t4) at which the crankshaft 12a starts to rotate can be accelerated. This leads to a reduction in the time required for cranking and further to a reduction in the engine start time.

4. Fourth Embodiment

Then, a fourth embodiment according to the present disclosure will be described with reference to FIGS. 10 and 11.

4-1. Cranking Torque Amplification Control

The fourth embodiment is different from the first embodiment described above in the following points. FIG. 10 is a time chart showing the outline of a cranking torque amplification control according to the fourth embodiment.

In the torque amplification control according to the first embodiment, as shown in FIG. 3, the MG torque Tmg fluctuates in a rectangular wave shape. In contrast, in the present embodiment, the ECU 22 fluctuates the MG torque Tmg in a sine wave shape (more specifically, a sine half wave shape) as shown in FIG. 10.

Figure 10:
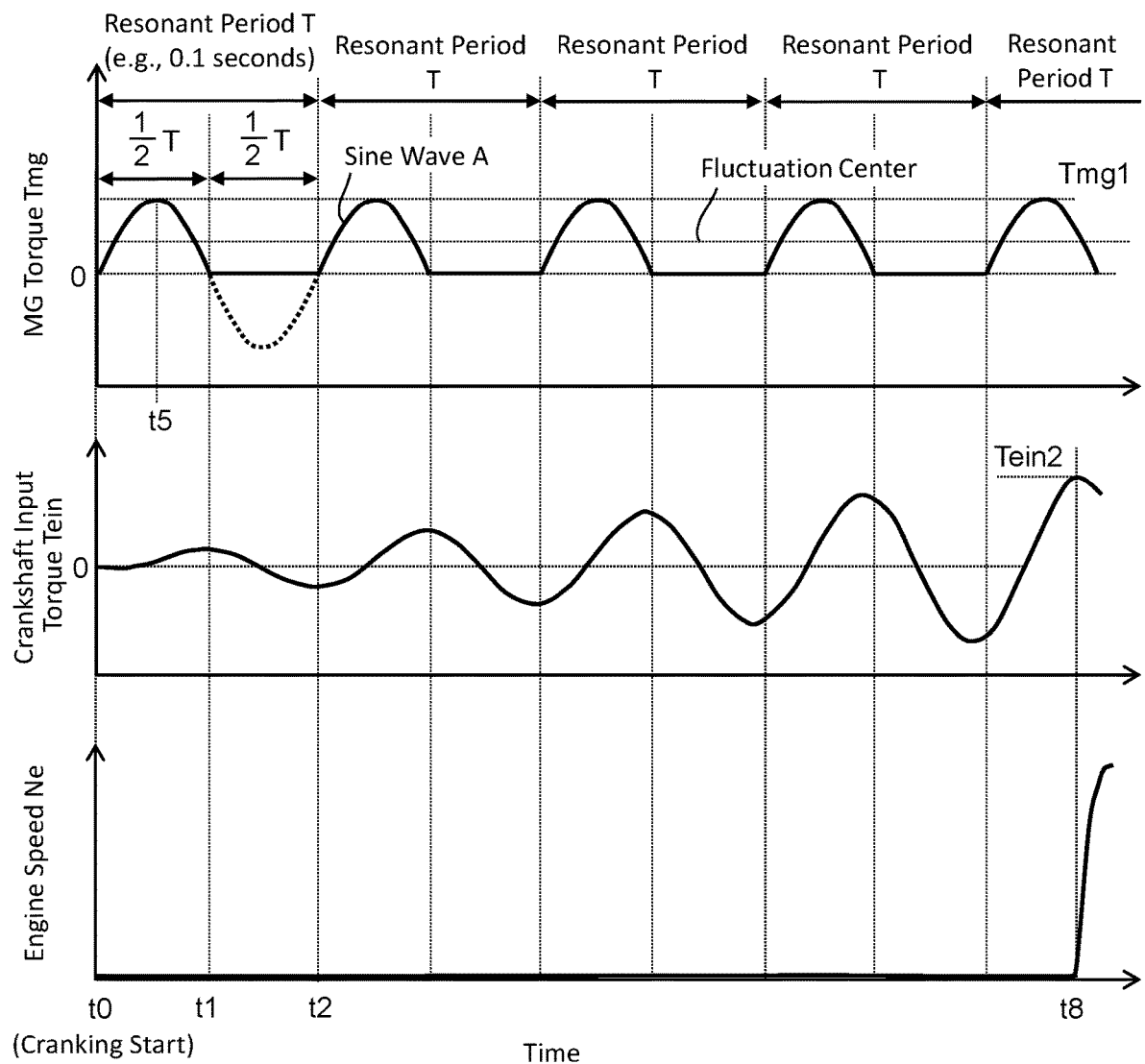
FIG. 10 is a time chart showing an outline of a cranking torque amplification control according to a fourth embodiment of the present disclosure.

To be more specific, in the example shown in FIG. 10, in the first half of the resonant period T, the ECU 22 controls the PCU 24 so as to generate an MG torque Tmg having a waveform of a sine wave A (i.e., a sine half wave waveform) whose amplitude is the torque value Tmg1 and whose period is the resonant period T. In addition, in this waveform of the MG torque Tmg, the torque value Tmg1 is obtained at a time point t5 at which the ¼ period of the resonant period T has elapsed. Furthermore, in the remaining half period of the resonant period T, similarly to the first embodiment, the MG torque Tmg is made zero. In addition, even in the example shown in FIG. 10, the fluctuation center of the MG torque Tmg during the execution of the torque amplification control is located within the positive torque range.

Figure 11:
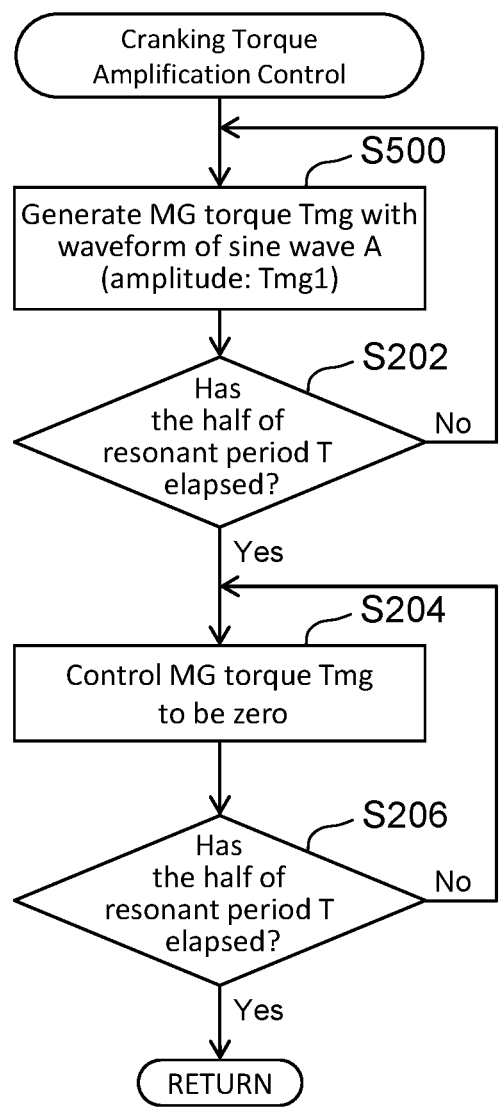
FIG. 11 is a flowchart showing a subroutine of the cranking torque amplification control used in the fourth embodiment of the present disclosure.

FIG. 11 is a flowchart showing a subroutine of the cranking torque amplification control used in the fourth embodiment. In the present embodiment, instead of the processing of the subroutine shown in FIG. 6 associated with step S104, the processing of the subroutine shown in FIG. 11 is executed.

The subroutine shown in FIG. 11 is the same as the subroutine shown in FIG. 6 except that the processing of step S200 is replaced with the following step S500. In step S500, the ECU 22 controls the PCU 24, during the half of the resonant period T, so as to generate an MG torque Tmg having the waveform of the sine wave A (i.e., the sine half wave waveform) whose amplitude is the torque value Tmg1 and whose period is the resonant period T.

4-2. Effect

According to the torque amplification control of the fourth embodiment described so far, the MG torque Tmg fluctuates in a sine wave shape (sine half wave shape). As a result, when compared with the first embodiment using the rectangular wave shape, the energy input to the first MG 14 for cranking (i.e., the electric power required for cranking) can be effectively reduced while the time required for the crankshaft 12a to start rotating is made substantially the same.

The reason why the above-described effect can be obtained is as follows. That is, when the MG torque Tmg is controlled under a constant applied voltage, the MG torque Tmg is proportional to the MG current flowing through the first MG 14. Also, the product of current, voltage and time corresponds to work (i.e., the energy given to the system). Therefore, it can be said that the integrated value of the MG torque waveform as shown in FIG. 3 or 10 (i.e., the value proportional to the time integrated value of the MG current under a constant applied voltage) is proportional to the energy input to the first MG 14.

Furthermore, according to the simulation conducted by the inventors of the present application, the following results were obtained. That is, for the powertrain system 10 in which the resonant period T has a certain value, the inventors of the present application calculated the time required for the crankshaft 12a to start rotating and the integrated value of the MG torque waveform proportional to the input energy to the first MG 14 for each of examples A and B, under the condition that the amplitude is the same in the torque value Tmg1. In the example A, the MG torque Tmg is changed in the rectangular wave shape as shown in FIG. 3 of the first embodiment. In the example B, the MG torque Tmg is changed in the sine wave shape as shown in FIG. 10. As a result, according to the torque amplification control of the present embodiment using the sine wave shape, the time required for the crankshaft 12a to start rotating was increased by about 0.1 seconds but the integrated value of the MG torque waveform (that is, the input energy) was reduced by about 18%, as compared with the first embodiment.

5. Fifth Embodiment

Then, a fifth embodiment according to the present disclosure will be described with reference to FIGS. 12 and 13.

5-1. Cranking Torque Amplification Control

The fifth embodiment is different from the first embodiment described above in the following points. FIG. 12 is a time chart showing the outline of the cranking torque amplification control according to the fifth embodiment. The torque amplification control according to the present embodiment corresponds to an example obtained by combining the methods of the third and fourth embodiments described above.

Figure 12:
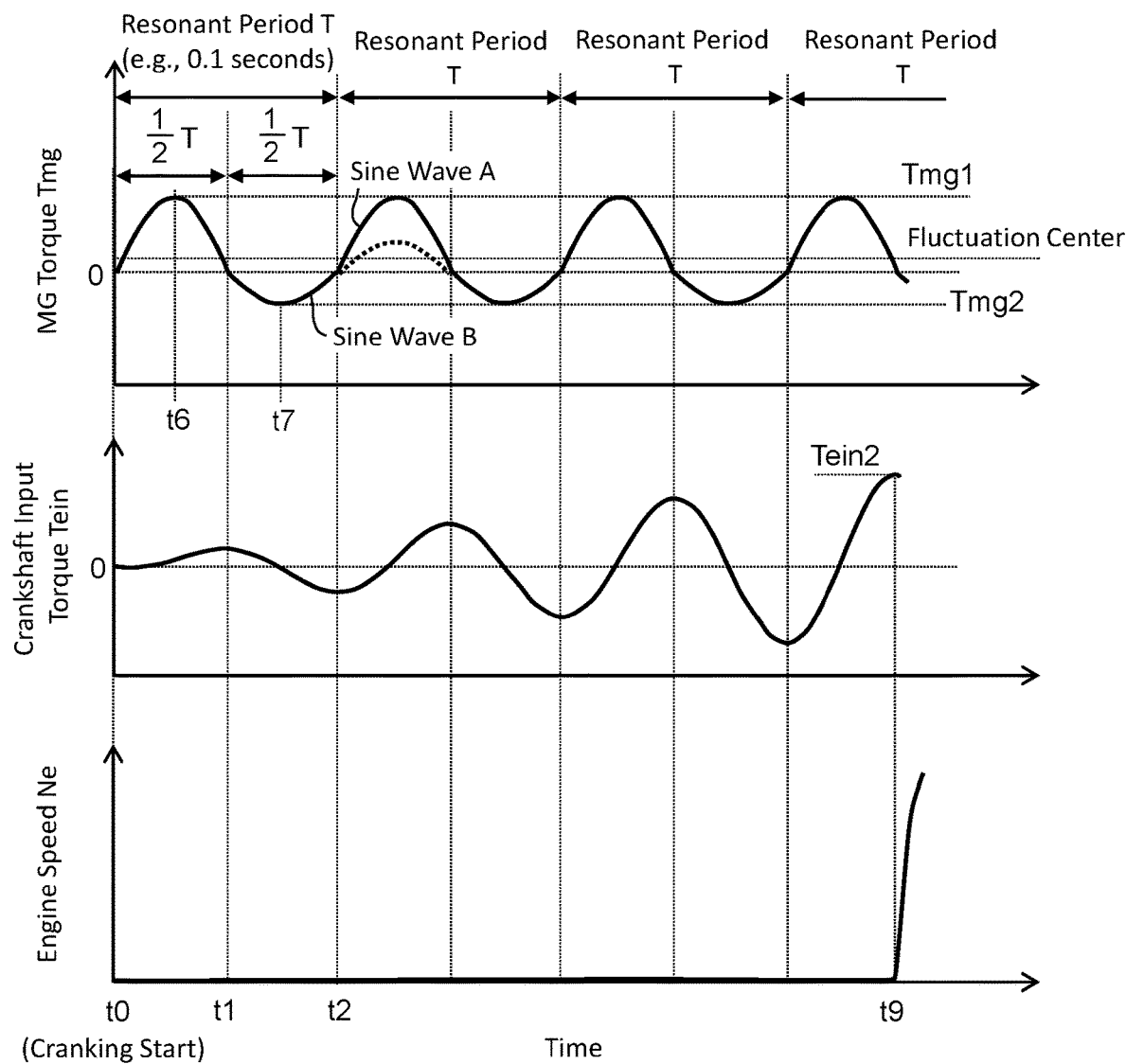
FIG. 12 is a time chart showing an outline of a cranking torque amplification control according to the a fifth embodiment of the present disclosure.

Specifically, in the present embodiment, similarly to the third embodiment, the fluctuation of the MG torque Tmg is executed using the torque range on the positive side and the torque range on the negative side as shown in FIG. 12. Moreover, as an example, similarly to the third embodiment, the MG torque Tmg is alternately changed between the positive torque value Tmg1 and the negative torque value Tmg2 every half of the resonant period T. On that basis, according to the present embodiment, the ECU 22 fluctuates the MG torque Tmg in a sine wave shape (more specifically, sine half wave shape) in both the torque range on the positive side and the torque range on the negative side.

To be more specific, in the example shown in FIG. 12, in the first half of the resonant period T, similarly to the fourth embodiment, the ECU 22 controls the PCU 24 so as to generate an MG torque Tmg having the waveform of the sine wave A (i.e., the sine half wave waveform) whose amplitude is the torque value Tmg1 and whose period is the resonant period T. On the other hand, in the remaining half of the resonant period T, the ECU 22 controls the PCU 24 so as to generate an MG torque Tmg having a waveform of a sine wave B (a sine half wave waveform) whose amplitude is the negative torque value Tmg2 and whose period is the resonant period T. In addition, in this waveform of the MG torque Tmg, the torque value Tmg1 is obtained at a time point t6 at which the quarter of the resonant period T elapses, and the negative torque value Tmg2 is obtained at a time point t7 at which the third quarter (¾) of the resonant period T elapses. Then, even in the example shown in FIG. 12, in order to prevent reverse rotation of the crankshaft 12a, the fluctuation center of the MG torque Tmg during the execution of the torque amplification control is set to be located within the positive torque range.

Figure 13:
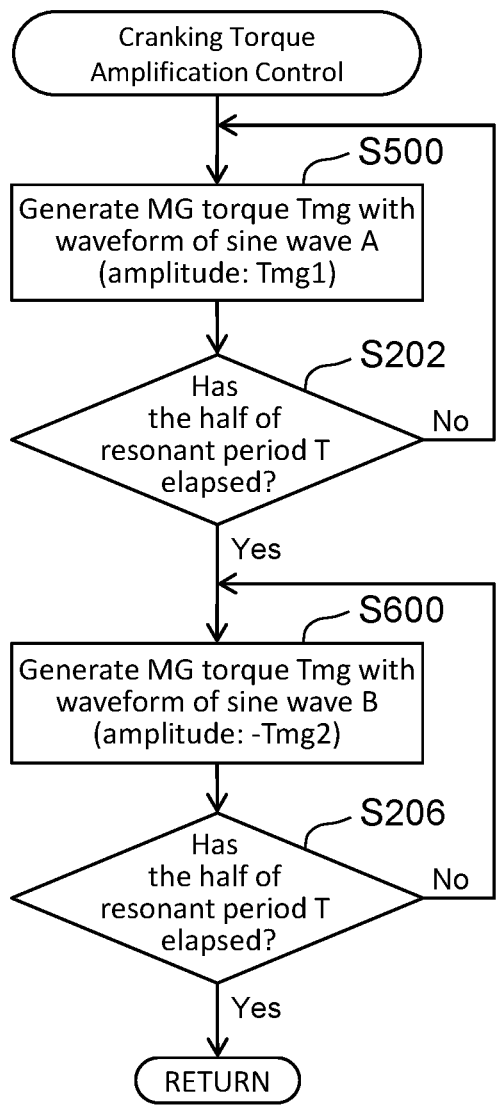
FIG. 13 is a flowchart showing a subroutine of the cranking torque amplification control used in the fifth embodiment of the present disclosure.

FIG. 13 is a flowchart showing a subroutine of the cranking torque amplification control used in the fifth embodiment. In the present embodiment, instead of the processing of the subroutine shown in FIG. 6 associated with step S104, the processing of the subroutine shown in FIG. 13 is executed.

The subroutine shown in FIG. 13 is the same as the subroutine shown in FIG. 6 except that the processing of step S200 is replaced with step S500 (see FIG. 11) and the processing of step S204 is replaced with the following step S600. In step S600, the ECU 22 controls the PCU 24, during the second half of the resonant period T, so as to generate an MG torque Tmg having the waveform of the sine wave B (i.e., the sine half wave waveform) whose amplitude is the negative torque value Tmg2 and whose period is the resonant period T.

5-2. Effect

According to the torque amplification control of the fifth embodiment described so far, the MG torque Tmg fluctuates in a sine wave shape (more specifically, sine half wave shape) in both the torque range on the positive side and the torque range on the negative side. First, similarly to the third embodiment, by greatly changing the torsion angle ω of the torsional damper 50, the torsional resonance can be excited earlier and the crankshaft input torque Tein can be changed with a greater width of change at an earlier timing. Therefore, as compared with a time point t8 in the fourth embodiment (see FIG. 10), the time point at which the crankshaft 12a starts to rotate (a time point t9 in FIG. 12) can be accelerated. This leads to a reduction in the time required for cranking and a reduction in the engine start time.

Furthermore, when compared with the third embodiment using a rectangular wave shape, it is also possible to effectively reduce the energy input to the first MG 14 for cranking while making the time required for the crankshaft 12a to start rotating substantially the same. In detail, according to the simulation results by the inventors of the present application, in the example shown in FIG. 12 of the present embodiment, when compared with the example shown in FIG. 8 of the third embodiment, the time required for the crankshaft 12a to start rotating was increased by about 0.05 seconds but the integrated value of the MG torque waveform (that is, the input energy) was reduced by about 20%.

6. Other Embodiments

6-1. Other Examples of System Configuration

The powertrain system 10 shown in FIG. 1 described above is configured such that the crankshaft 12a is always disconnected from the drive shafts 32, not only the time of engine start. However, the powertrain system to which the cranking torque amplification control according to the present disclosure can be applied is not limited to the example shown in FIG. 1, as long as the powertrain system is configured such that the crankshaft and the rotating shaft of the motor generator are not connected to the drive shafts of the vehicle at least at the time of engine start.

Figure 14:
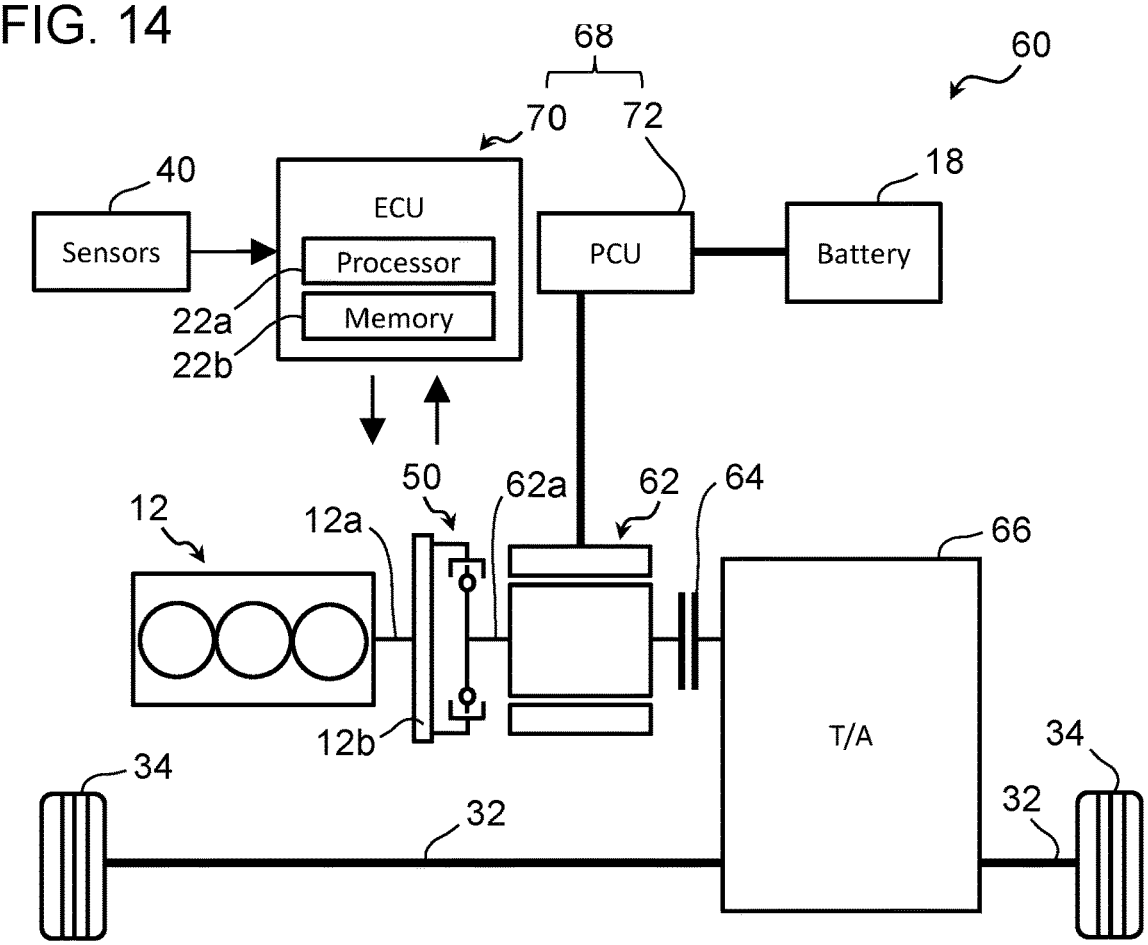
FIG. 14 is a schematic diagram showing a configuration of another powertrain system to which the present disclosure is applied.

FIG. 14 is a schematic diagram showing a configuration of another powertrain system 60 to which the present disclosure is applied. The powertrain system 60 shown in FIG. 14 includes an MG 62, a clutch 64, a transaxle (T/A) 66 and a control device 68, together with the internal combustion engine 12 and the torsional damper 50. In this example, a rotating shaft 62a of the MG 62 is connected to the crankshaft 12a via the torsional damper 50. The control device 68 includes an ECU 70 and a PCU 72, and has the same function as the control device 20. The clutch 64 may connect/disconnect the power transmission path between the MG 62 and the T/A 66 based on a command from the ECU 70. The T/A 66 includes a transmission (not shown) such as an automatic transmission and differential gears (not shown). A vehicle equipped with the powertrain system 60 is a front-wheel drive vehicle configured to drive the vehicle wheels 34, which are front wheels.

In the powertrain system 60, the MG 62 (which corresponds to an example of the "motor generator" according to the present disclosure) selectively executes both vehicle drive and power generation using engine power. Then, according to the powertrain system 60, at the time of engine start, cranking is performed using the MG 62 while the clutch 64 is disconnected. Thus, the powertrain system 60 is configured such that the crankshaft 12a and the rotating shaft 62a of the MG 62 are not connected to the drives shafts 32 at the time of engine start.

Figure 15:
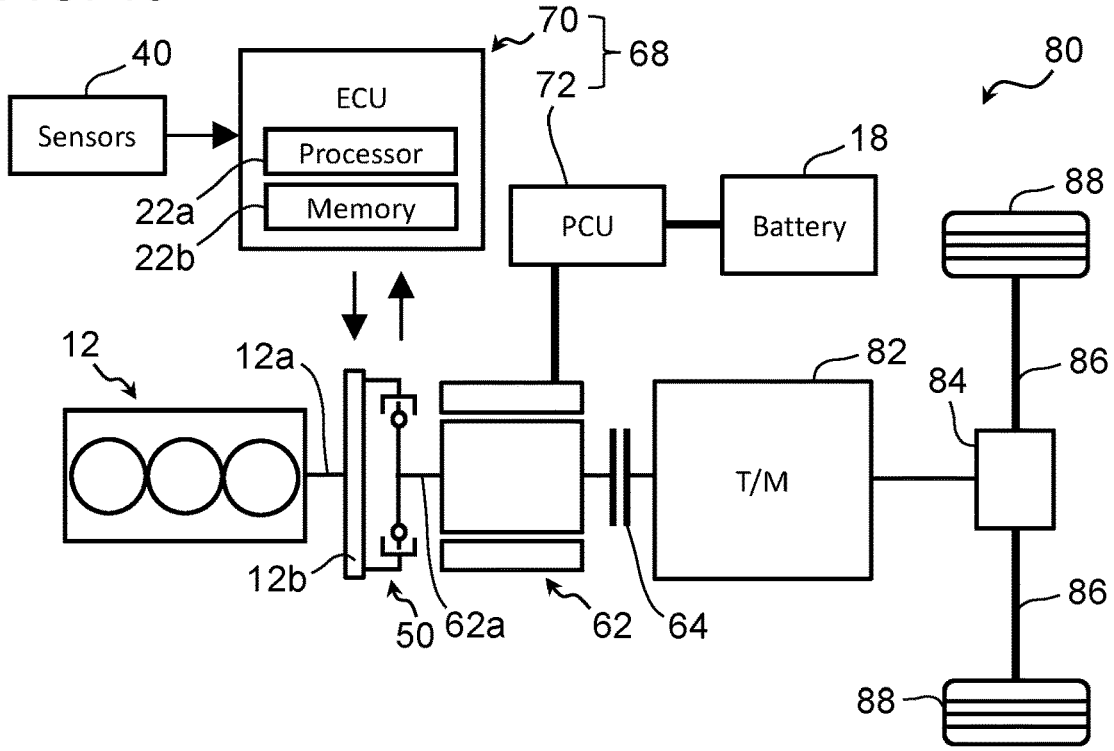
FIG. 15 is a schematic diagram showing a configuration of still another powertrain system to which the present disclosure is applied.

FIG. 15 is a schematic diagram showing a configuration of still another powertrain system 80 to which the present disclosure is applied. The powertrain system 80 shown in FIG. 15 includes a transmission (T/M) 82, such as an automatic transmission, and differential gears 84, together with the internal combustion engine 12, the torsional damper 50, the MG 62, the clutch 64 and the control device 68. The powertrain system 80 is different from the configuration shown in FIG. 14 in that the motive power of each of the internal combustion engine 12 and the MG 62 is transmitted to rear wheels 88 via the T/M 82, the differential gears 84 and drive shafts 86. That is, a vehicle equipped with the powertrain system 80 is a rear-wheel drive vehicle. Then, even in the powertrain system 80, at the time of engine start, cranking is performed using the MG 62 while the clutch 64 is disconnected.

Figure 16:
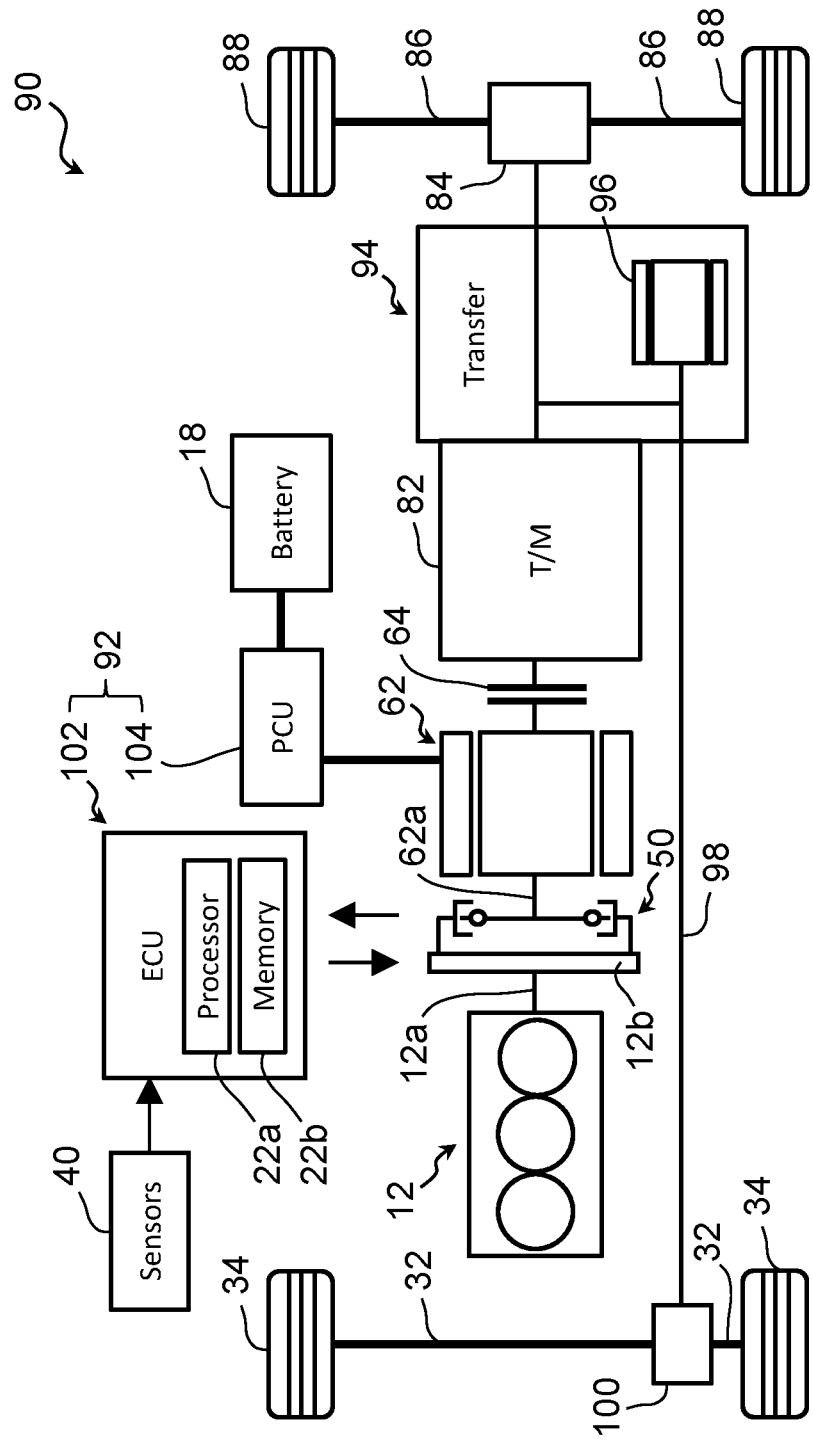
FIG. 16 is a schematic diagram showing a configuration of yet another powertrain system to which the present disclosure is applied.

FIG. 16 is a schematic diagram showing a configuration of yet another powertrain system 90 to which the present disclosure is applied. The powertrain system 90 shown in FIG. 16 includes a control device 92, a transfer 94, an MG 96, a propeller shaft 98 and differential gears 100, together with the internal combustion engine 12, the torsional damper 50, the MG 62, the clutch 64, the transmission 82 and the differential gears 84. The MG 96 is built into the transfer 94. The control device 92 includes an ECU 102 and a PCU 104, and has the same function as the control device 20. In this powertrain system 90, the rear wheels 88 are driven by the internal combustion engine 12 and the MG 62. The front wheels 34 are driven by the MG 96 together with the internal combustion engine 12 and the MG 62 via the propeller shaft 98, the differential gears 100 and the drive shafts 32. That is, a vehicle equipped with the powertrain system 90 is a four-wheel drive vehicle. Then, even in the powertrain system 90, at the time of engine start, cranking is performed using the MG 62 while the clutch 64 is disconnected.

6-2. Other Examples of MG Torque Waveform

Figure 17:
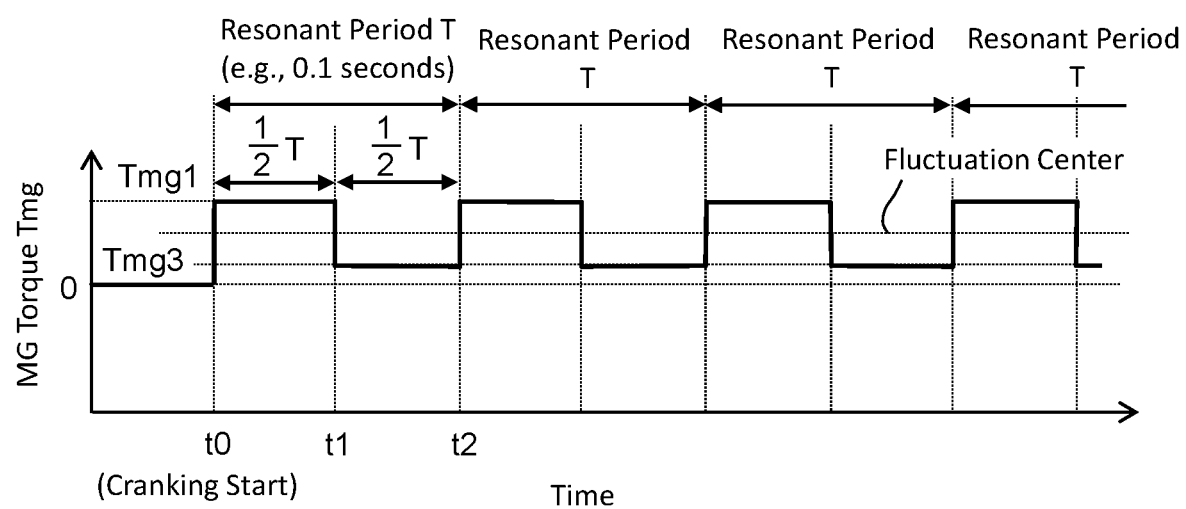
FIG. 17 is a time chart used to describe an example of an MG torque waveform according to another embodiment of the present disclosure.

FIG. 17 is a time chart used to describe an example of the MG torque waveform according to another embodiment of the present disclosure. In the example shown in FIG. 17, unlike the examples described above, the ECU 22 fluctuates the MG torque Tmg only within a torque range higher than zero. More specifically, as an example, the MG torque Tmg is alternately changed every half period of the resonant period T between the positive torque value Tmg1 and a positive torque value Tmg3. The torque value Tmg3 is greater than zero and less than the torque value Tmg1. It should be noted that, even in this example, the fluctuation center of the MG torque Tmg is located within the positive torque range. Furthermore, the MG torque waveform shown in FIG. 17 has a rectangular wave shape, but may have a sine wave shape similarly to the examples of the fourth and fifth embodiments described above.

According to the example shown in FIG. 17 described above, the width of change of the torsion angle ω during the execution of the torque amplification control is smaller than those of the examples described above, but the effect of amplifying the crankshaft input torque Tein by using the torsional resonance of the torsional damper 50 can be obtained similarly to the other first to fifth embodiments.

The embodiments and modification examples described above may be combined in other ways than those explicitly described above as required and may be modified in various ways without departing from the scope of the present disclosure.

What is claimed is:
1. A powertrain system, comprising:
an internal combustion engine including a crankshaft;
a motor generator including a rotating shaft connected to the crankshaft via a torsional damper; and
a control device configured to control the internal combustion engine and the motor generator, wherein
the powertrain system is configured such that the crankshaft and the rotating shaft are not connected to a drive shaft of a vehicle equipped with the powertrain system at least at a time of engine start,
where a direction of an MG torque, which is a torque output from the motor generator when the crankshaft is rotated in a forward rotation direction, is positive, the control device is configured to execute a cranking torque amplification control that controls the motor generator such that the MG torque output from the motor generator for cranking the internal combustion engine fluctuates in a resonant period of the torsional damper while making a fluctuation center of the MG torque higher than zero.

2. The powertrain system according to claim 1, wherein in the cranking torque amplification control, the control device fluctuates the MG torque using a torque range on a positive side and a torque range on a negative side.

3. The powertrain system according to claim 1, wherein in the cranking torque amplification control, the control device fluctuates the MG torque in a sine wave shape.

4. The powertrain system according to claim 1, wherein in the cranking torque amplification control, the control device fluctuates the MG torque in a rectangular wave shape.

5. The powertrain system according to claim 1, wherein the control device is configured to execute the cranking torque amplification control when outside air temperature is lower than a first threshold value.

6. The powertrain system according to claim 1, wherein the control device is configured to execute the cranking torque amplification control when temperature of the internal combustion engine is lower than a second threshold value.

7. The powertrain system according to claim 1, wherein the control device is configured to execute the cranking torque amplification control when voltage of a battery that supplies electric power to the motor generator is lower than a third threshold value.

8. The powertrain system according to claim 1, wherein the control device is configured to execute the cranking torque amplification control when state of charge of a battery that supplies electric power to the motor generator is lower than a fourth threshold value.

9. The powertrain system according to claim 1, wherein the vehicle is a series hybrid vehicle or a range extended electric vehicle in which the internal combustion engine is dedicated to electric power generation and the motor generator generates electric power using a motive power of the internal combustion engine.

* * * * *